(12) United States Patent
Batteram et al.

(10) Patent No.: US 8,001,575 B2
(45) Date of Patent: Aug. 16, 2011

(54) METHOD OF DISTRIBUTING VIDEO-ON-DEMAND OVER AN INTERNET PROTOCOL NETWORK INFRASTRUCTURE

(75) Inventors: Harold Batteram, Kortenhoef (NL); Mohamed El-Sayed, Tinton Falls, NJ (US)

(73) Assignee: Alcatel Lucent, Paris (FR)

( * ) Notice: Subject to any disclaimer, the term of this patent is extended or adjusted under 35 U.S.C. 154(b) by 743 days.

(21) Appl. No.: 11/842,539

(22) Filed: Aug. 21, 2007

(65) Prior Publication Data

US 2009/0055880 A1    Feb. 26, 2009

(51) Int. Cl.
*H04N 7/173* (2006.01)
(52) U.S. Cl. .......................................... 725/97; 725/101
(58) Field of Classification Search ................ 386/1, 46, 386/68–70, 125–126
See application file for complete search history.

(56) References Cited

U.S. PATENT DOCUMENTS

| | | | | |
|---|---|---|---|---|
| 6,144,400 | A * | 11/2000 | Ebisawa | 725/101 |
| 6,701,528 | B1 * | 3/2004 | Arsenault et al. | 725/89 |
| 7,194,757 | B1 * | 3/2007 | Fish et al. | 725/121 |
| 2002/0095510 | A1 * | 7/2002 | Sie et al. | 709/231 |
| 2002/0157103 | A1 * | 10/2002 | Song et al. | 725/97 |
| 2004/0045029 | A1 * | 3/2004 | Matsuura | 725/93 |
| 2005/0028219 | A1 * | 2/2005 | Atzmon et al. | 725/116 |
| 2005/0183127 | A1 * | 8/2005 | Ngo et al. | 725/90 |
| 2006/0029078 | A1 * | 2/2006 | Lu et al. | 370/395.2 |
| 2006/0126667 | A1 * | 6/2006 | Smith et al. | 370/486 |
| 2006/0206565 | A1 * | 9/2006 | Ganesan et al. | 709/204 |
| 2007/0192812 | A1 * | 8/2007 | Pickens et al. | 725/94 |
| 2007/0250875 | A1 * | 10/2007 | Weaver | 725/89 |
| 2009/0070842 | A1 * | 3/2009 | Corson | 725/116 |

* cited by examiner

*Primary Examiner* — Andrew Y Koenig
*Assistant Examiner* — Jason Chung
(74) *Attorney, Agent, or Firm* — Williams, Morgan & Amerson, P.C.

(57) ABSTRACT

The present invention provides a method of operating a set-top box that is coupled to a video display, the set-top box being configured for communication with a video content provider. One embodiment of the method may include initiating display of a first portion of video content that is pre-loaded onto the set-top box and transmitting a request to subscribe to a first multicast service in response to initiating display of the first portion of the video content. The video content provider is configured to provide a second portion of the video content using the first multicast service.

20 Claims, 4 Drawing Sheets

METHOD OF DISTRIBUTING VIDEO-ON-DEMAND OVER AN INTERNET PROTOCOL NETWORK INFRASTRUCTURE

BACKGROUND OF THE INVENTION

1. Field of the Invention

This invention relates generally to communication systems, and, more particularly, to video-on-demand systems.

2. Description of the Related Art

Conventional customer premises equipment for cable television and/or satellite television typically includes a video display (such as a television set) and a set-top box that provides the interface to the video content provider. The set-top box may be a stand-alone device or it may be implemented in other equipment, such as a video game console. Both video content providers and their customers have recognized the value in providing video content, such as feature-length movies, on-demand via the set-top box. For example, many video content providers allow customers to select movies from a menu provided using the set-top box. The video content provider may then distribute a video data stream so that the selected movies may be viewed by the requesting customer. For example, a video stream in an Internet Protocol Television (IPTV) infrastructure consists of an ordered sequence of video frames, encapsulated in IP packets. The video frames may be received at the set-top box and buffered or stored in memory until the ordered sequence of video frames is played out using the display.

Video-on-demand systems typically unicast the video streams to the set-top box of the requesting customer. In a unicast system, a dedicated channel is formed between the video content provider and the set-top box and the video stream is transmitted over this dedicated channel. Customers have the freedom to start, stop, pause, and/or resume unicast video streams at any time. However, video streams cannot be broadcast to groups of customers using a collection of unicast (point-to-point) video streams because the arbitrary starting, stopping, pausing, and/or resuming of the video streams generally leads to timing differences between the streams transmitted to each customer. These timing differences cannot be accommodated by a unicast video stream and so each customer requires their own unicast video stream. Consequently, the network bandwidth consumed by unicast video-on-demand movies increases approximately in proportion to the number of customers receiving video data streams. The total available bandwidth for conventional video-on-demand systems can easily be exhausted, particularly in cases where a large number of users attempt to view very popular movies. The potential network exhaustion severely limits the number of video-on-demand movies that can be distributed concurrently by an IPTV network, which may reduce the potential revenue income to the content provider.

FIG. 1 conceptually illustrates one embodiment of a conventional IPTV network 100 that implements unicasting of video-on-demand content. A video content provider 105 is configured to unicast video content to one or more customers 110 (only one indicated by a numeral in FIG. 1) in response to a request transmitted by the customer. In the illustrated embodiment, five of the six customers 110 have requested video content. A dedicated channel is formed between the video content provider 105 and each of the requesting customers 110, as indicated by the boldface arrows. The dedicated channels are formed a network of nodes 115 (only one indicated by a numeral in FIG. 1) that are connected by wired and/or wireless communication links. When a packet 120 of video content is unicast to one or more of the customers 110, the packet travels over the dedicated link between the video content provider 105 and he customer 110. If the customers 110 are watching the same video content at approximately the same time, then the packets 120 are duplicated and so each of the dedicated channels is concurrently transmitting the same packets 120.

FIG. 2 conceptually illustrates one conventional multicasting system 200 implements multicasting of video-on-demand content. A video content provider 205 is configured to multicast video content to one or more customers 210 (only one indicated by a numeral in FIG. 2) in response to a request transmitted by the customer. In the illustrated embodiment, five of the six customers 210 have requested video content. Each of the requesting customers 210 is scheduled to receive the same video content at the same time. The video content provider 205 may then provide a single packet 215 of video content over a single channel indicated by the boldface arrows. When this packet 215 is received at each node 220 in the system 200, the node 220 transmits a copy of the packet 215 over each branch of the network. Finally, the last node 220 transmits copies of the video content packets 215 to the requesting customers 210.

Multicasting video content to customers can reduce the bandwidth used over each branch of the network because only a single copy of video content is transmitted over each branch. However, this advantage comes at the expense of requiring that each customer receive the video content at the same time. Thus, customers who receive multicast video content do not have the freedom to start, stop, pause, and/or resume the multicast video streams at arbitrary times. One alternative to simple multicasting of the video content is to maintain multiple multicast video streams that have staggered starting times. This approach, which is sometimes referred to as near video-on-demand, allows customers to select from a range of staggered starting times. However, near video-on-demand solutions still did not provide customers with complete freedom to start, stop, pause, and/or resume the video streams. Furthermore, the bandwidth requirements of near video-on-demand increase as the number of available concurrent data streams having different starting times increases. Consequently, near video-on-demand solutions may also suffer from network bandwidth exhaustion if the number of available starting times is raised too high.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for operating a set-top box that is coupled to a video display, the set-top box being configured for communication with a video content provider. One embodiment of the method may include initiating display of a first portion of video content that is pre-loaded onto the set-top box and transmitting a request to subscribe to a first multicast service in response to initiating display of the first portion of the video content. The video content provider is configured to provide a second portion of the video content using the first multicast service.

In another embodiment of the present invention, a method is provided for operating a video content provider that is configured for communication with a plurality of set-top boxes. One embodiment of the method includes receiving, from at least one first set-top box, a request to subscribe to a first multicast service in response to said at least one first set-top box initiating display of a first portion of video content. The first portion was previously stored on the first set-top box. The method also includes adding the first set-top box to a first multicast group for receiving the first multicast service and providing a second portion of the video content to the first multicast group using the first multicast service.

BRIEF DESCRIPTION OF THE DRAWINGS

The invention may be understood by reference to the following description taken in conjunction with the accompanying drawings, in which like reference numerals identify like elements, and in which.

Figure 1:
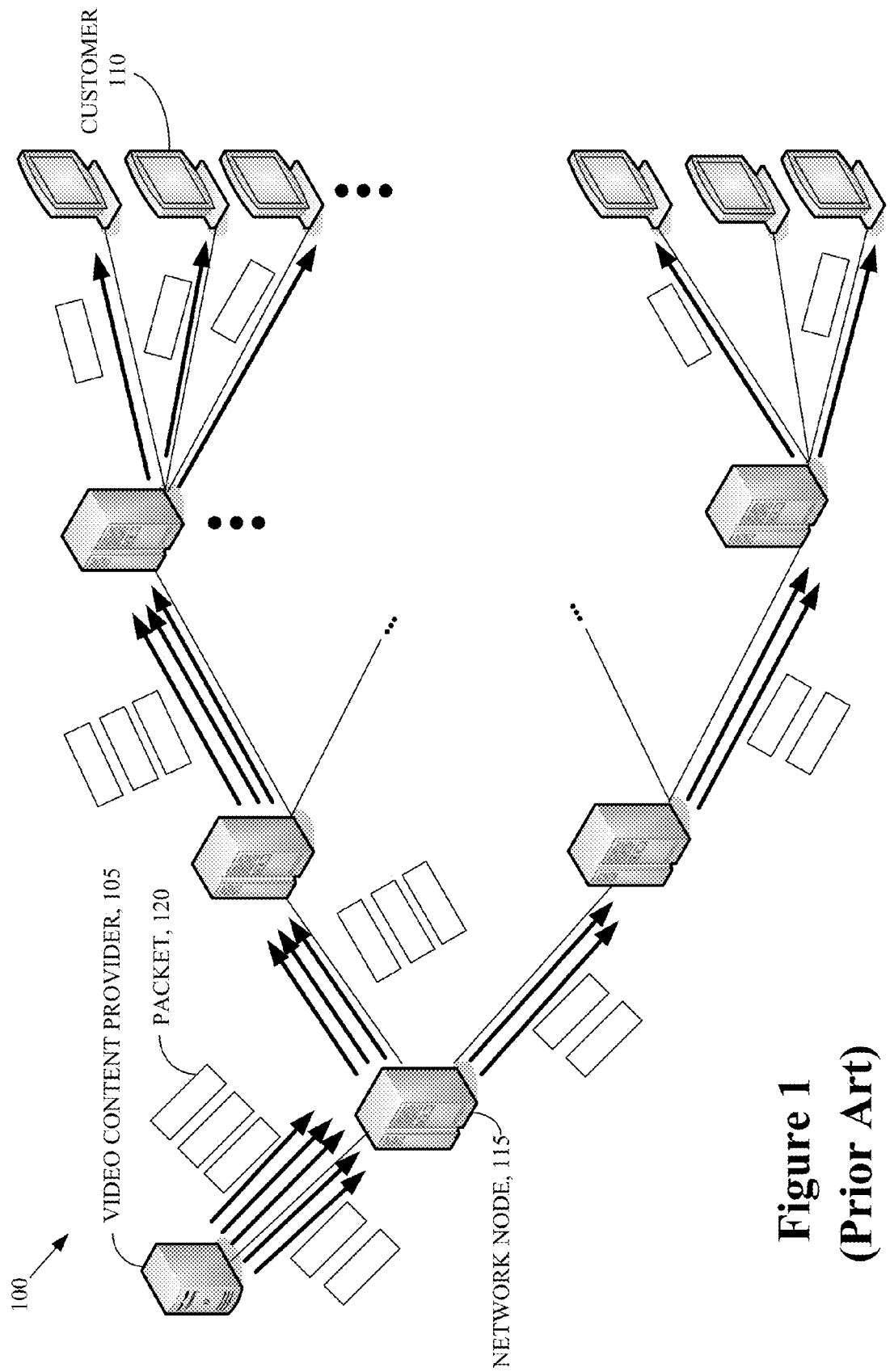
FIG. 1 conceptually illustrates one embodiment of a conventional IPTV network that implements unicasting of video-on-demand content.
Figure 2:
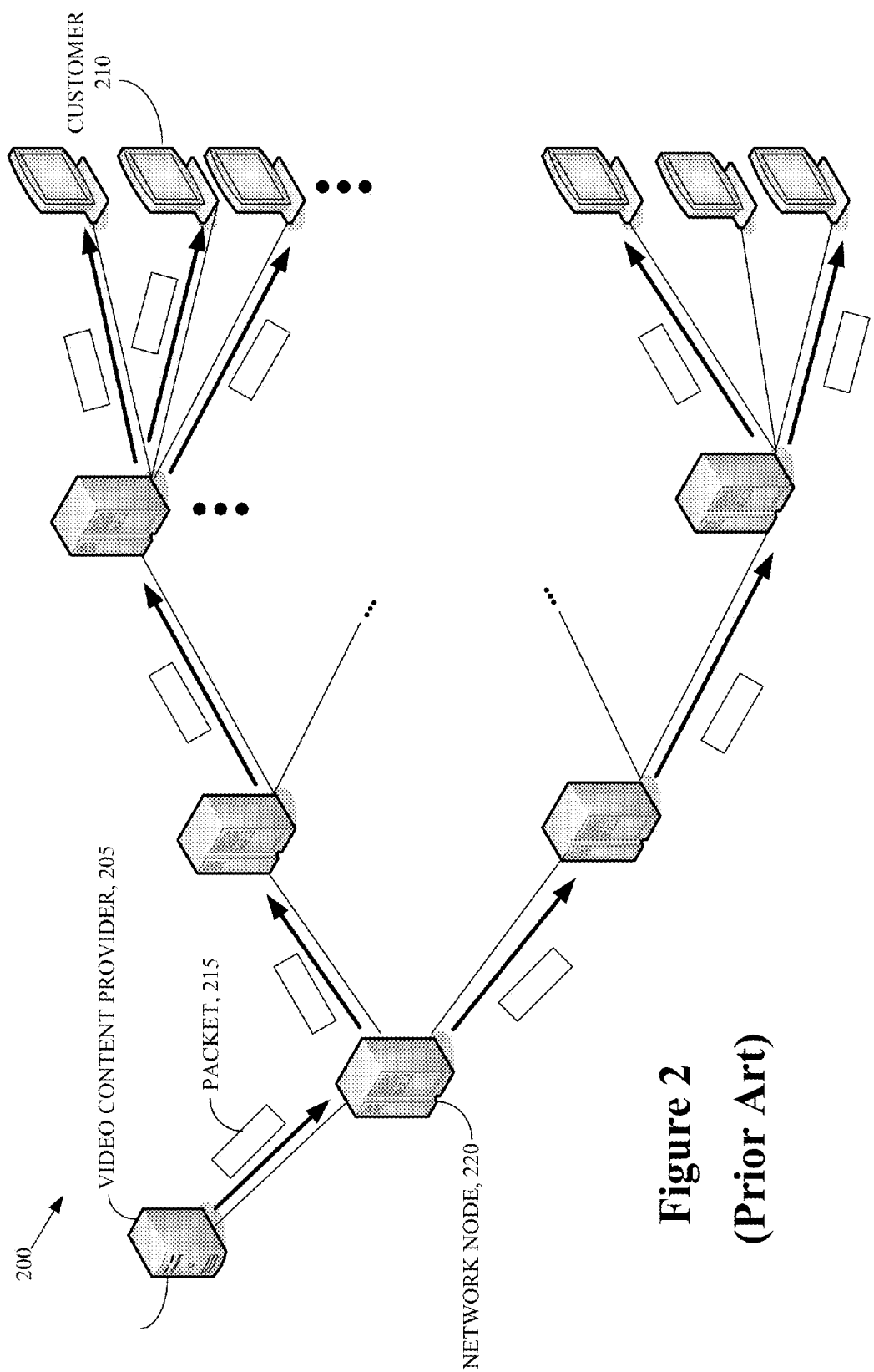
FIG. 2 conceptually illustrates one embodiment of a conventional IPTV network that implements multicasting of video-on-demand content.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 3:
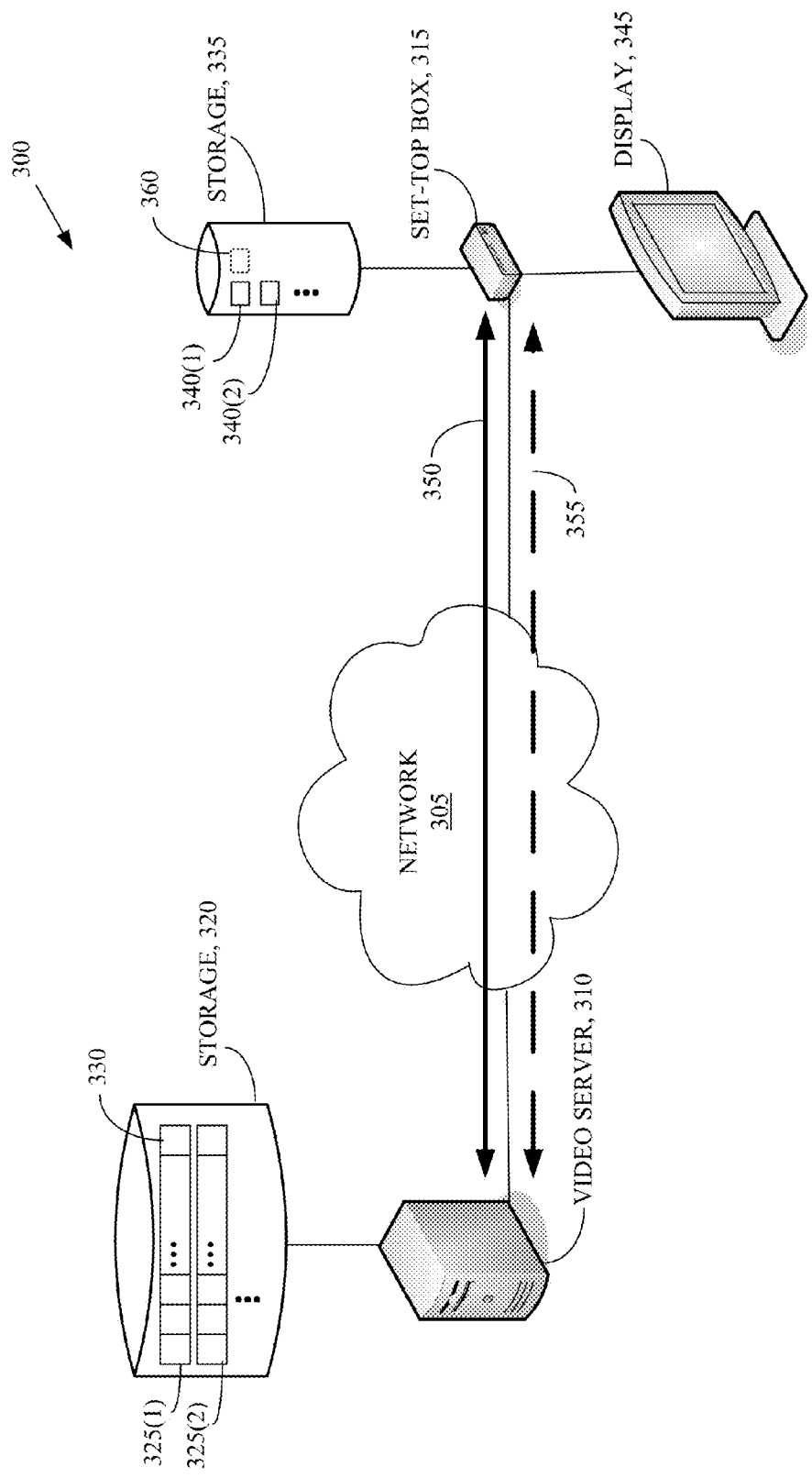
FIG. 3 conceptually illustrates one exemplary embodiment of a communication system that implements preloading and multicasting video content, in accordance with the present invention.

FIG. 3 conceptually illustrates one exemplary embodiment of a communication system 300 that implements preloading and multicasting video content. In the illustrated embodiment, the communication system 300 includes a network 305 that supports multicast transmissions between entities including a video server 310 and a set top box 315. Techniques for multicasting (or other point-to-multipoint communications) are known in the art and in the interest of clarity only those aspects of multicasting that are relevant to the present invention will be discussed herein. The network 305 shown in FIG. 3 operates according to the Internet Protocol (IP) and supports IP television (IPTV). However, persons of ordinary skill in the art having benefit of the present disclosure should appreciate that the present invention is not limited to network 305 that support either IP or IPTV. In alternative embodiments, other standards and/or protocols for transmitting video or other multimedia content may be used in the communication system 300. Furthermore, the network 305 may include wired portions, wireless portions, or any combination thereof.

The video server 310 is communicatively coupled to one or more storage or memory elements 320. In the illustrated embodiment, the storage element 320 stores digital representations of video content, such as digital representations of one or more movies 325. The movies 325 are partitioned into segments 330 (only one segment indicated by numeral in FIG. 3). In one embodiment, the video server 310 may determine the size of the segments 330 based on criteria such as network conditions, channel qualities, a size of various memory elements within the communication system 300, bandwidth within the network 305, and the like. Alternatively, the size of the segments 330 may be predetermined, e.g., using predetermined or estimated values indicating the expected or anticipated network conditions, channel qualities, sizes of various memory elements within the communication system 300, bandwidth within the network 305, and the like.

The set top box 315 is also coupled to a storage or memory element 335. In one embodiment, the storage element 335 may be incorporated within the set top box 315. Alternatively, the set top box 315 may be coupled to an external storage element 335 such as an external hard drive. The storage element 335 stores pre-provisioned and/or pre-loaded segments 340 to video content. The segments 340 correspond to the first segments 330 of a selected subset of the movies 325 (or other video or multimedia content) stored on the storage element 320. In one embodiment, the selected subset of the movies 325 corresponds to the most popular movies, e.g., the movies 325 that are most often requested by users of the set top boxes 315 and/or the movies 325 that were most popular when released in theaters. The segments 340 of the selected subset of the movies 325 may be provided over the network 305 or may be loaded into the storage element 335 during initial configuration of the storage element 335 and/or the set top box 315. In one embodiment, the video server 310 preloads the segments 340 byte multicasting the segments 340 to the set-top box 315 during periods of low network occupancy, such as late at night or early in the morning.

When a user selects one of the subset of the movies 325 for viewing, e.g., on a display 345 connected to the set-top box 315, the set-top box 315 accesses one of the first segments 340 corresponding to the selected movie 325 and begins to play out the digital content on the display 345. The set-top box 315 also transmits one or more control signals to the video server 310, as indicated by the solid arrow 350. The control signal includes at least one control message and requests subscription of the set-top box 315 to a multicast group that receives transmission of the next segment of the selected movie 325. In one embodiment, the control message may be used to request a single subsequent segment of the movie 325. Alternatively, the control message may be used to request multiple segments of the movie 325. The number of requests at segments may depend on the storage available at the set-top box 315 and/or the available network bandwidth. Persons of ordinary skill in the art having benefit of the present disclosure should appreciate that initiation of play out of the digital content and transmission of the control message may occur in any order and/or concurrently.

Upon receipt of the request to subscribe to the multicast group, the video server 310 determines whether or not there is a current multicast group that is currently multicasting the requested segment of the selected movie 325 to other set top boxes. If the requested multicast group exists, then the video server 310 subscribe to the set-top box 315 to the multicast group so that the requested segment can be multicast to the set-top box 315, as indicated by the dashed arrow 355. If the requested multicast group does not exist, then the video server 310 creates the multicast group, subscribes the set-top box 315 to the newly created multicast service/group, and begins multicasting (at 355) the requested segment using the new multicast service. Once a multicast service has been established and the video server 310 has begun multicasting video content to the multicast group, the video server 310 may continue to multicasting video content as long as at least one set-top box is subscribed to the multicast group. For example, the video server 310 may cyclically and/or periodically multicast information indicative of the digital representation of the segment or segments 330 that are being multicast using the associated multicast service.

The set-top box 315 receives the multicast segment and stores or buffers the segment 360 in the storage element 335. Since the video server 310 repeatedly transmits the requested segments 330 to the multicast group, the set-top box 315 may replace corrupted or incorrectly received portions of the digital information indicative of the requested segments 330 with subsequently transmitted copies of the corrupted or incorrectly received portions. In the set-top box 315 has completed playing out the initial segment 340 of the selected movie, the set-top box 315 may initiate play out of the newly received segment 360 on the display 345. The set-top box 315 also transmits one or more control signals 350 to the video server 310 including at least one control message that requests subscription of the set-top box 315 to a multicast group that receives transmission of one or more subsequent segments of the selected movie 325. As discussed above, initiation of play out of the digital content and transmission of the control message may occur in any order and/or concurrently. This process may be repeated until the entire movie 325 has been played out. Alternatively, the process may be suspended in response to the user housing or stopping play out of the movie 325. A suspended movie 325 may be resumed at any time using the currently stored segment 360. Resuming a suspended movie 325 may also result in transmission of a request to subscribe to the multicast group associated with the next segment of the movie 325.

Since the packets of information used to transmit the segments 330, 360 can all be multicast to the set-top boxes 315, transmission of this data does not need to be duplicated in multiple concurrent data streams, which may reduce the load on the network 305. Furthermore, the maximum required bandwidth for the video transmission depends on the maximum number of segments being multicasted in parallel. This number is known per movie and therefore maximum bandwidth needed can be predicted, e.g., by the video server 310. The communication system 300 may use this information for capacity reservation and management. These advantages do not, however, place any limitations on the freedom of a user to start, stop, pause, and/or resume the multicast video streams at arbitrary times.

Figure 4:
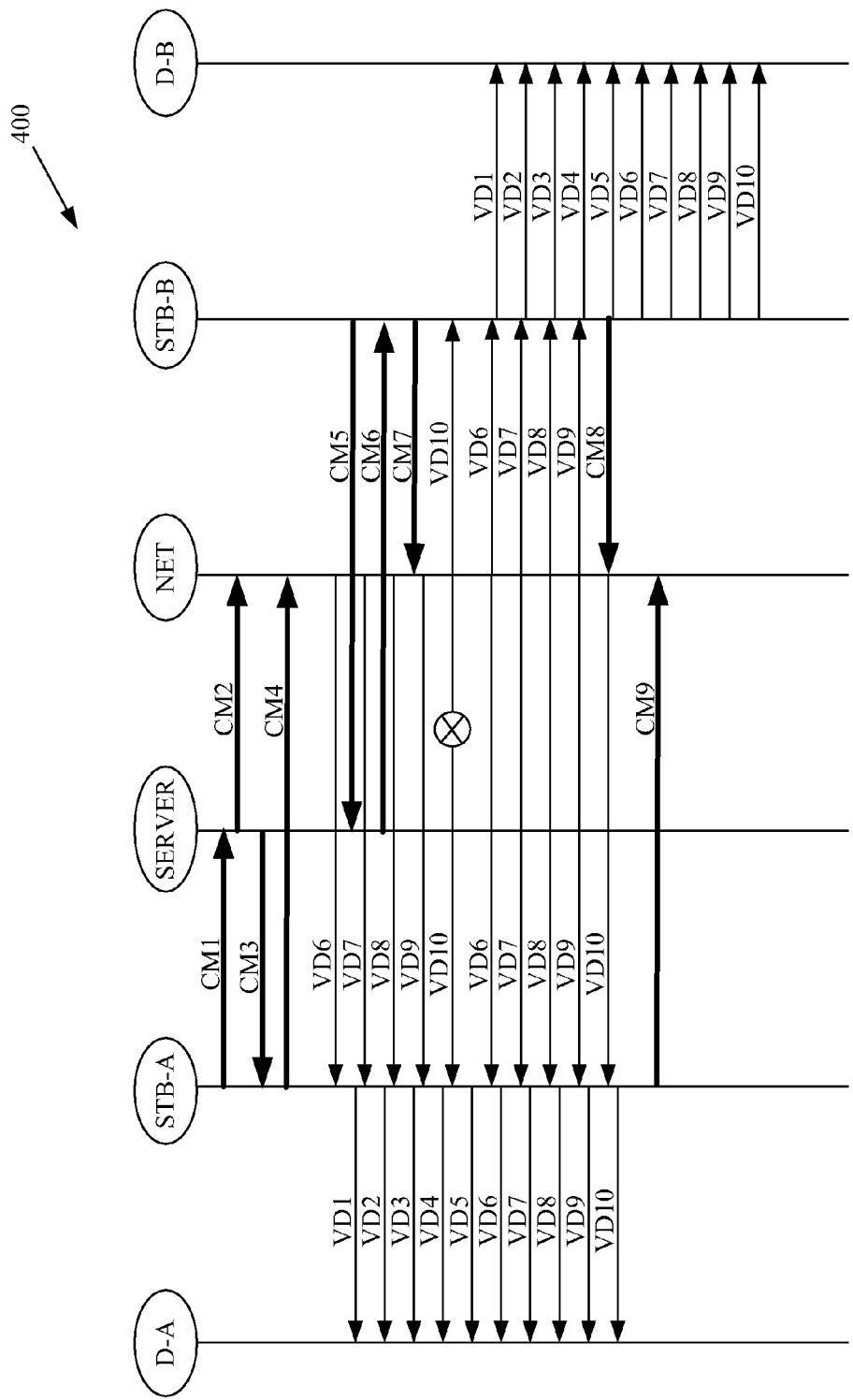
FIG. 4 conceptually illustrates one exemplary embodiment of a method of preloading and multicasting video content, in accordance with the present invention.

FIG. 4 conceptually illustrates one exemplary embodiment of a method 400 of preloading and multicasting video content. In the illustrated embodiment, the communication system includes two set-top boxes (STB-A, STB-B), two associated video displays (D-A, D-B), a video server (SERVER) and the network (NET). Both STB-A and STB-B already have the first video data segment consisting of data packets number 1-5 in their storage. Persons of ordinary skill in the art having benefit of the present disclosure should appreciate that the present invention is not limited to segmentation of the movie into this particular number of data packets. In alternative embodiments, each segment can include any number of data packets and, in practice, the actual number of segment data packets may be much larger, but is kept small in this example for illustrative purposes. In this exemplary embodiment, the second video data segment consists of data packets number 6-10.

In operation, the following control messages are exchanged:

CM 1. This message is used by the STB-A to request a video from the VOD server.

CM 2. The VOD server creates the required number of multicast groups for the second and subsequent segments, possibly after doing appropriate customer authentication, authorization and accounting actions.

CM 3. The VOD server instructs STB-A to start playing out the video using the display D-A.

CM 4. The STB-A issues a multicast join request to the network to receive the second video segment data. The video data is received in data packets number VD 6-VD 10 and stored in the STB-A storage until needed by the display D-A. After having received VD 6, the display D-A starts displaying video data VD 1 from the storage.

CM 5. The STB-B issues this control message to request the same video from the VOD server.

CM 6. The VOD server already has created the required multicast groups and instructs STB-B to start playing out the video on the display D-B (possibly after doing appropriate customer authentication, authorization and accounting actions).

CM 7. STB-B issues a multicast join request to receive the second video segment data. The video data is received in data packets number VD 10-VD 9. This is because the multicast group distributes the same data to joined STBs simultaneously. The VOD server cyclically transmits the segment video data packets while the multicast group is still joined by at least one STB. The STB stores the received segment video data packets until all segment packets have been received. After having received VD 10, display D-B starts displaying video data packet 1 from the storage.

CM 8. STB-B has received all video data and issues a multicast leave command to the network and stops receiving video data.

CM 9. STB-A has received video data packet 10 with a transmission error in the first cycle, as indicated by the circle with the X in it. STB-A therefore remains joined to the multicast group until it has received another copy of video data packet 10 in the next cycle and uses this data for the display. This illustrates how transmission errors or lost packets can be corrected or replaced in those cases where the received video data packet is received from the network the second time while it not yet been used by the display. In the exemplary embodiment shown in FIG. 7, only one segment is received from the network, but in an actual implementation multiple segments can be received in parallel from multiple multicast groups. This may increase the possibility that lost or corrupted data packets may be replaced because segments stored in advance can be retransmitted in multiple cycles before needed by the display. After having received VD 10, STB-A also issues a leave command to the network. The multicast group is now empty and the network stops transmitting.

Embodiments of the techniques described herein may have a number of advantages over conventional practice. For example, preloading portions of selected video content and then multicasting subsequently requested portions of the video content may reduce the bandwidth requirements, relative to systems that multicast the entire movie in response to a user request. The bandwidth saved will depend on the number of segments that a movie is partitioned into and the number of concurrent users per movie. For example suppose a two hour movie is segmented into 8 segments (each segment of 15 minutes), each segment requires 2 Mb/s transmission bandwidth and that movie is watched by 100 different subscribers during a 2 hour period, and each subscriber starts to watch at an arbitrary time, the maximum bandwidth peak for this movie will be 200 Mb/s. Using embodiments of the techniques described herein, the maximum bandwidth is 7×2=14 Mb since a maximum of 7 segments need to be transmitted concurrently (the first segment is pre-buffered and does not need to be transmitted). The pre-buffer capacity needed in this example is (2×60×15)/8=225 MB. In the worst case, a segment is transmitted to a single subscriber only and the required bandwidth is equal to the unicast solution.

The number of simultaneous viewers within a segment view time can be increased by time based pricing strategies, e.g., starting a movie within the first 15 minutes of the hour could be priced cheaper. Operators could further stimulate concurrency (and therefore bandwidth economy) by grouping movies in attractively priced clusters, (for example, clusters could be determined based on subscriber preference profiles) and pre-buffer these clusters into the customers STB. The storage requirements for the first segment may be reduced by data compression techniques and removing the transmission overhead. The solution requires the availability of video data storage for the STB. For years, storage capacity has been increasing at lower costs per byte while video compression techniques have improved. These trends are in favor of the described solution and may allow more segments to be pre-loaded in the customer's STB. In an extreme case only a single segment is used per movie and pre-loaded, i.e. the complete movie is available at the STB.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method of operating a set-top box that is coupled to a video display, the set-top box being configured for communication with a video content provider, comprising:
    initiating display of a first portion of video content that is pre-loaded onto the set-top box;
    transmitting a request to subscribe to a first multicast service in response to initiating display of the first portion of the video content, the video content provider being configured to provide at least one second portion of the video content using the first multicast service, and wherein the video content provider initiates transmission of said at least one second portion of the video content in response to a first user subscribing to the first multicast service, cyclically and repeatedly transmits said at least one second portion of the video content as long as at least one user is subscribed to the first multicast service, and stops transmission of the first multicast service when a last user leaves so that no users are subscribed to the first multicast service.

2. The method of claim 1, wherein the video content is segmented into the first portion and said at least one second portion and stored prior to pre-loading the first portion onto the set-top box, and comprising pre-loading the first portion of the video content prior to initiating display of the first portion of the video content.

3. The method of claim 2, wherein preloading the first portion of the video content comprises at least one of installing the first portion of the video content during initial configuration of the set-top box and receiving a multicast of the first portion of the video content during at least one period of low network occupancy.

4. The method of claim 2, wherein preloading the first portion of the video content comprises preloading video content associated with an initial portion of one or more selected movies, and wherein said one or more selected movies are segmented into the initial portion and at least one additional portion prior to pre-loading the initial portion onto the set-top box.

5. The method of claim 1, wherein transmitting the request to subscribe to the first multicast service comprises transmitting the request in response to user input initiating display of the first portion of the video content.

6. The method of claim 1, comprising:
receiving said at least one second portion of the video content via the first multicast service in response to transmitting the request to subscribe to the first multicast service;
storing said at least one second portion of the video content until display of the first portion of the video content has substantially completed; and
displaying said at least one second portion of the video content in response to completion of display of the first portion of the video content.

7. The method of claim 6, wherein receiving said at least one second portion of the video content comprises receiving said at least one second portion of the video content from the video content provider.

8. The method of claim 7, comprising performing error correction on said at least one second portion of the video content using the repeatedly transmitted copies of said at least one second portion of the video content.

9. The method of claim 6, comprising transmitting at least one request to subscribe to at least one second multicast service in response to displaying said at least one second portion of the video content.

10. The method of claim 9, comprising:
receiving at least one third portion of the video content via said at least one second multicast service in response to transmitting the request to subscribe to said at least one second multicast service;
storing said at least one third portion of the video content until display of a previously received portion of the video content has substantially completed; and
displaying said at least one third portion of the video content in response to completion of display of the previously received portion of the video content.

11. A method of operating a video content provider that is configured for communication with a plurality of set-top boxes, comprising:
receiving, at the video content provider from at least one first set-top box, a request to subscribe to a first multicast service in response to said at least one first set-top box initiating display of a first portion of video content, the first portion being previously stored on said at least one first set-top box;
adding said at least one first set-top box to a first multicast group for receiving the first multicast service; and
providing at least one second portion of the video content to the first multicast group using the first multicast service, and wherein the video content provider initiates transmission of said at least one second portion of the video content in response to a set-top box subscribing to the first multicast service, cyclically and repeatedly transmits said at least one second portion of the video content as long as at least one set-top box is subscribed to the first multicast service, and stops transmission of the first multicast service when a set-top box leaves so that no users are subscribed to the first multicast service.

12. The method of claim 11, comprising segmenting the video content into the first portion and said at least one second portion and storing the segmented video content prior to pre-loading the first portion onto the set-top box, and comprising multicasting the first portion of the video content to a plurality of set-top boxes including said at least one first set-top box to preload the first portion of the video content onto the plurality of set-top boxes during at least one period of low network occupancy.

13. The method of claim 12, wherein multicasting the first portion of the video content comprises multicasting video content associated with an initial portion of one or more selected movies.

14. The method of claim 13, wherein receiving the request to subscribe to the first multicast service comprises receiving the request in response to user input to the set-top box initiating display of the first portion of the video content.

15. The method of claim 11, wherein adding said at least one first set-top box to a first multicast group comprises forming the first multicast group if no set-top boxes are currently subscribed to the first multicast group when said at least one first set-top box subscribes to the first multicast group.

16. The method of claim 11, wherein providing said at least one second portion of the video content comprises not providing the video content when no set-top boxes are subscribed to the first multicast group.

17. The method of claim 11, comprising receiving, from at least one set-top box that was previously subscribed to the first multicast group, at least one request to subscribe to at least one second multicast service in response to providing said at least one second portion of the video content to the first multicast group.

18. The method of claim 17, comprising adding said at least one set-top box that was previously subscribed to the first multicast group to at least one second multicast group for receiving said at least one second multicast service.

19. The method of claim 18, comprising:
providing at least one third portion of the video content to said at least one second multicast group via said at least one second multicast service in response to receiving the request to subscribe to said at least one second multicast service.

20. The method of claim 19, wherein providing said at least one third portion of the video content to said at least one second multicast group comprises providing said at least one third portion of the video content to said at least one second multicast group concurrently with providing the second portion of the video content to the first multicast group.

* * * * *